United States Statutory Invention Registration [19]

[11] Reg. Number: H823

Conkle et al. [43] Published: Oct. 2, 1990

[54] CHEMICAL PROTECTIVE BALACLAVA

[75] Inventors: James P. Conkle; William J. Sears, both of San Antonio, Tex.

[73] Assignee: The United States of America as represented by the Secretary of the Air Force, Washington, D.C.

[21] Appl. No.: 46,604

[22] Filed: May 7, 1987

[51] Int. Cl.[5] ..... A42B 1/06; A42B 1/04

[52] U.S. Cl. ..... 2/410; 2/6; 2/84; 2/205

[58] Field of Search ..... 2/6, 84, 171.2, 173, 2/205, 410, 423, 424, 5, 7, 202, 206; 128/201.25, 201.29, 202.11, 201.23

[56] References Cited

U.S. PATENT DOCUMENTS

| | | | |
|---|---|---|---|
| 521,939 | 6/1894 | Pozdena et al. | 2/424 X |
| 2,728,916 | 1/1956 | Clarke et al. | 2/82 |
| 2,800,901 | 7/1957 | Monro | 128/141 |
| 2,869,133 | 1/1959 | Garbellano | 2/68 |
| 3,458,864 | 8/1969 | Austin et al. | 2/5 |
| 4,266,301 | 5/1981 | Canda | 2/6 X |
| 4,382,440 | 5/1983 | Kapp et al. | 128/201.25 |
| 4,427,425 | 1/1984 | Briggs | 55/159 |
| 4,529,623 | 7/1985 | Maggs | 427/227 |
| 4,622,696 | 11/1986 | Griffiths | 2/6 |
| 4,657,808 | 4/1987 | Maggs | 428/263 |

FOREIGN PATENT DOCUMENTS

| | | | |
|---|---|---|---|
| 0053936 | 6/1982 | European Pat. Off. . | |
| 54154 | 6/1982 | European Pat. Off. | 2/5 |
| 130283 | 1/1985 | European Pat. Off. | 2/410 |
| 194657 | 9/1986 | European Pat. Off. | 2/424 |
| 3127955 | 12/1982 | Fed. Rep. of Germany | 2/84 |
| 3138697 | 4/1983 | Fed. Rep. of Germany | 128/201.25 |
| 2665 | 8/1982 | PCT Int'l Appl. | 2/202 |
| 556744 | 10/1943 | United Kingdom | 2/6 |
| 1173142 | 12/1969 | United Kingdom | 2/202 |
| 1173143 | 12/1969 | United Kingdom | 2/205 |
| 1455531 | 10/1976 | United Kingdom . | |
| 2078491 | 1/1982 | United Kingdom | 2/84 |

OTHER PUBLICATIONS

*Charcoal Cloth,* Brochure by Charcoal Cloth Ltd., Wimbourne, Dorset, England.

Technical Article, "Sorption of Nitrogen, Water Vapor, and Benzene by Charcoal Cloth" by P. G. Hall and R. T. Williams, 10/86, Journal of Colloid and Interface Science.

Technical Article, "Absorption Interaction of Water with Microporous Adsorbents" by S. Barton and J. Koresh, 6/82, Journal of the Chem. Soc.

Technical Article, "Study of Molecular Sieve Carbons" by J. Koresh and A. Soffer, 8/79, Journal of the Chem. Soc.

"Dictionary of Science and Technology" by T. C. Collocott M.A., p. 14, Barnes & Noble, New York.

McGraw-Hill Dictionary of Science and Technical Terms by D. N. Lapedes, p. 223, McGraw-Hill, New York.

*Primary Examiner*—Thomas H. Tarcza

*Assistant Examiner*—Linda J. Wallace

*Attorney, Agent, or Firm*—William G. Auton; Donald J. Singer

[57] ABSTRACT

A protective hood (balaclava) for ground and aircrews is disclosed. The protective balaclava may be worn beneath chemical respirators and flight helmets, and is fabricated from activated charcoal fabric to provide additional protection against chemical agents. The activated charcoal cloth acts as both a shield and provides absorptive layers to absorb toxic chemicals that might otherwise contact bare skin. For wearers, this balaclava provides an under-the-helmet disposable charcoal fabric hood that overlaps the top of the undercoverall, the facial opening of which can be drawn over the periphery of the facepiece of the chemical biological oxygen (CBO) mask.

1 Claim, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CHEMICAL PROTECTIVE BALACLAVA

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to the field of protective clothing, and more specifically to a protective hood (balaclava) for ground and aircrews.

Aircrew (AC) and ground personnel require individual protective ensembles during all phases of a mission because of the impracticality of preventing chemical agents in a liquid, aerosol, vapor, or particulate form from gaining access into the crew compartments of military aircraft. The potential sources of these chemical agents that pose this threat range from potential accidents to intentional chemical attacks by hostile forces.

The task of providing ground and aircrews with a suitable protective hood is alleviated, to some extent, by the systems disclosed in the following U.S. Patents, the disclosures of which are specifically incorporated by reference:

U.S. Pat. No. 2,728,916 issued to Clarke;
U.S. Pat. No. 2,800,901 issued to Monro;
U.S. Pat. No. 2,869,133 issued to Garbellano; and
U.S. Pat. No. 4,266,301 issued to Canda.

The above-cited references all disclose various systems of protective clothing. The Canda reference discloses a chemical biological agent protective hood comprising a helmet covering member, a hose enclosure member, a shoulder covering member and a rigid transparent lens. The hood is made of an impermeable material which fits down over the flight helmet and has a polycarbonate lens covering the face portion of the hood.

While all of the above cited references are instructive, most of these prior art references describe systems used to fully protect the person from a liquid/vapor agent threat when used with a filter/blower or other filter cannister. During the donning/doffing sequence, it has been established that most prior art systems will not provide the required protection to exposed skin, eyes or respiratory tract. This is also true if the filter/-blower system in Canda's system were to fail.

In view of the foregoing discussion, it is apparent that there currently remains the need for a protective balaclava which is capable of being worn under a flight helmet, and which provides back up protection for the various failure modes in current mask/respirator designs. The present invention is intended to satisfy that need.

SUMMARY OF THE INVENTION

The present invention is a simple, permeable, disposable, protective hood (balaclava) for ground and aircrew use that is to be worn in conjunction with either ground or aircrew chemical defense respirators. This "head sock" protects the exposed skin and eye/respiratory areas from agent vapor during donning and doffing of the chemical defense respirator(s).

One embodiment of the invention is a protective hood fabricated from activated charcoal cloth such that it sufficiently conforms to the head of the wearer to be worn under a flight helmet or chemical respirators. One suitable activated charcoal cloth is produced by Von Blucher in West Germany. Other carbon cloth materials have potential for use with this new invention, e.g. Remply Ltd. from the U.K. The cloth hood has been patterned in such a manner to form a sculptured cover for the head and neck with a flared apron to cover the shoulders. It is designed to be worn under any standard ground crew chemical mask/respirator, e.g. M17A1, XM-40, MCU-2/P. The activated charcoal cloth has been impregnated with a 1 inch flexible strip of rubber (viton, silicone or other) directly under the mask seal to reduce potential in-board leakage of toxic agents. Any leak that might occur between the face and the rubber impregnated strip would pass through the activated charcoal cloth and be filtered.

It is an object of the present invention to provide a chemically protective hood capable of being worn with either ground or aircrew chemical defense respirators and under flight helmets.

It is another object of the present invention to provide a protective hood that acts as absorptive layers against chemical agents.

It is another object of the present invention to provide chemically protective hood made from relatively inexpensive material, such that is disposible, rather than requiring decontamination.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

Figure 1:
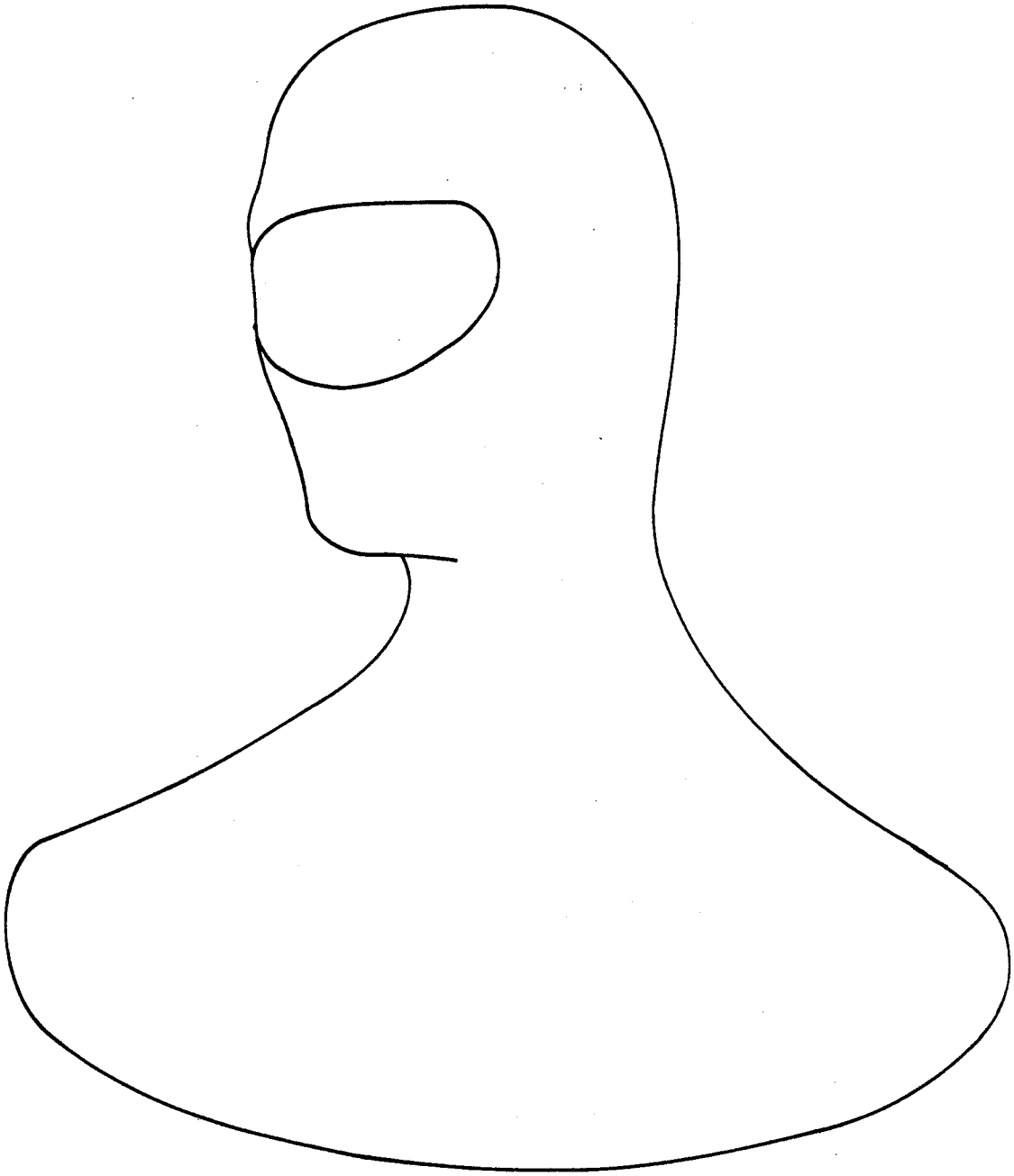
FIG. 1 is an illustration of the protective balaclava of the present invention.

The present invention is a protective hood (balaclava) for ground and aircrews. The reader's attention is now directed towards FIG. 1, which is an illustration of one embodiment of the present invention. As shown in FIG. 1, the hood is patterned in such a way as to fit over the head and neck with a flared portion or apron to cover the shoulders. It is designed to be worn under a standard chemical mask respirator.

The hood of FIG. 1 is fabricated using activated charcoal cloth produced by Von Blucher in West Germany. Other carbon cloth materials have potential for use with this invention, including that of Remploy Ltd. from the U.K. The advantage of using activated charcoal cloth in a back up system for chemical respirators is that the hood provides absorptive layers for additional protection against agent vapors.

Most operational hoods are quite effective in preventing liquid contamination from gaining access to the wearer's skin, but do not provide an effective vapor barrier. Indeed, vapor can easily creep under the current hoods during field conditions and will likely cause blistering in a matter of a few days. During shelter processing, vapor levels in the Liquid Hazard Area are high enough that problems can be expected in only a few pass-through with current equipment. A simple, inexpensive, disposable, absorptive Balaclava worn close to the skin is a preferrable alternative to exposure to bare skin.

The embodiment of the invention depicted in FIG. 1 can serve ground and air crews as an under-the-helmet disposable charcoal fabric hood that overlaps the top of conventional protective garments such as the under coverall. In one embodiment of the invention the facial opening can be drawn over the periphery of the facepiece of a chemical biological oxygen (CBO) mask. In this fashion, the "head sock" would protect the exposed skin and eye/respirator(s). The devices designed by others, and especially Canda, constitutes systems used to fully protect the person from a liquid/vapor agent threat when used with a filter/blower or other filter canister. During the donning/doffing sequence, it has been established that similar prior art systems will not provide the required protection to exposed skin, eyes or respiratory tract. This is also true if the filter/blower system in Canda's system were to fail. Therefore, it is recommended that the proposed balaclava be worn under the system designed by Canda for complete protection. The Canda system acts only as a shield and not as an absorptive filter against agents in vapor form. Therefore, the proposed balaclava has a fully separate function along with unique design over the other standard or developmental chemical defense respirators, i.e., it is designed to provide back up protection for the various failure modes in current mask/respirator designs.

Another advantage of the present invention is that impregnation of the permeable cloth directly under the respirator provides a unique leak free face seal 100 in both the ground and aircrew versions of the balaclava. This, coupled with small air passages through the thin rubber impregnated layer, provides for demisting of the lenses when wearing an aircrew mask with oxygen regulator on a safety setting.

Figure 2:
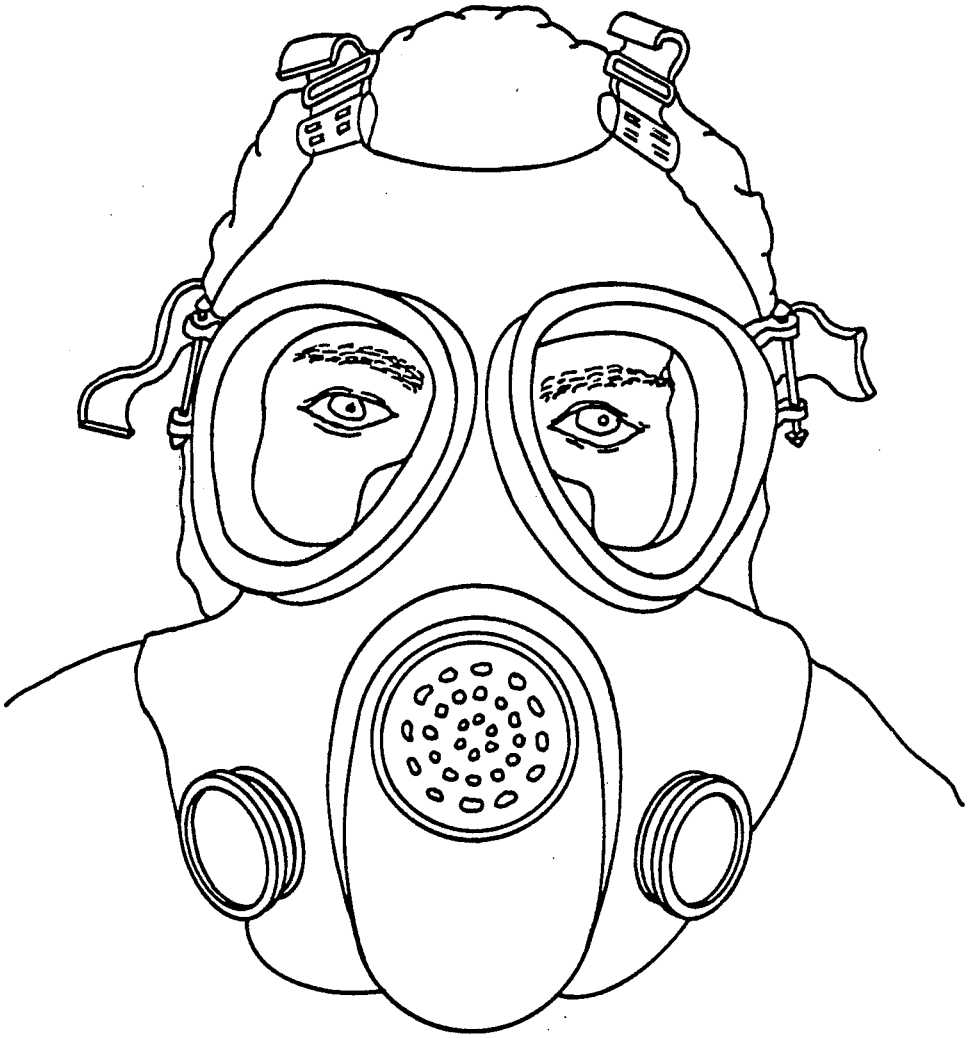
FIG. 2 is an illustration of the ground crew version of the invention worn beneath a chemical respirator.

FIG. 2 is an illustration of the balaclava worn beneath a chemical respirator. As mentioned above, the ground crew version of the invention is designed to be worn under any standard ground crew chemical mask/respirator, e.g. M17Al, XM-40, MCU-2/P. The activated charcoal cloth has been impregnated with a 1 inch flexible strip of rubber (viton, silicone or other) directly under the mask seal to reduce potential in-board leakage of toxic agents. Any leak that might occur between the face and the rubber impregnated strip would pass through the activated charcoal cloth and be filtered.

Figure 3:
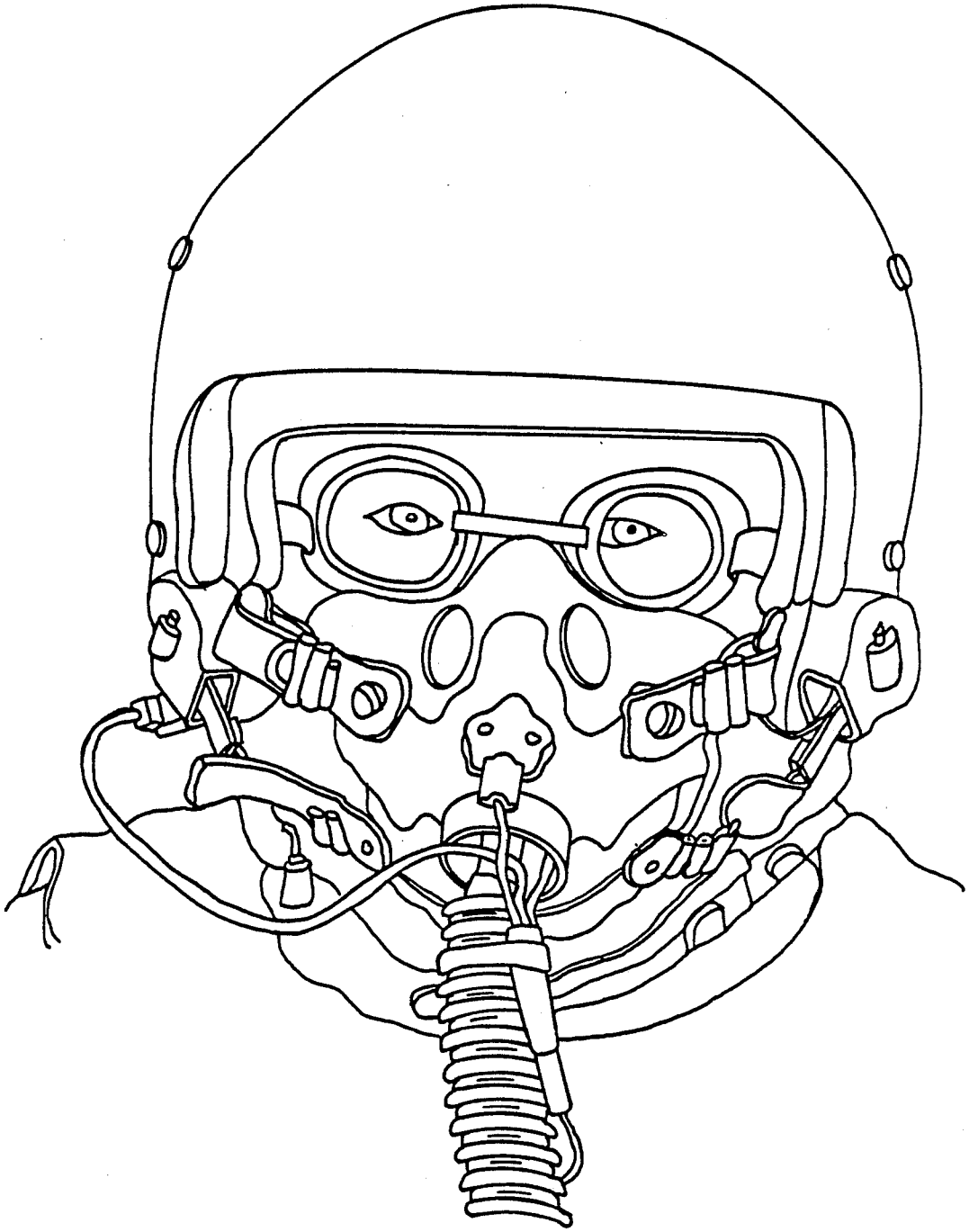
FIG. 3 is an illustration of the aircrew version of the present invention worn beneath a flight helmet assembly.

FIG. 3 is an illustration of the balaclava worn beneath a flight helmet assembly by any aircrew member. The aircrew Balaclava is similar in design that of the ground crew version except that: the cloth immediately over-/around the eyes is removed and special eye lens are sealed in the openings; the rubber strip impregnated into the cloth would be configured to fit directly beneath an oronasal pressure demand mask; small tubes would be passed through the oronasal rubber strip to the lens cavity to prevent/reduce fogging of the lens and increased protection when safety pressure is selected and; the crewmember would breath in-line filtered oxygen from the regulator through the mask cavity and through the charcoal cloth to increase the protection factor by filtration.

It is expected that the charcoal cloth combined with the mask will provide adequate protection for the aircrew. As in current systems a filter/blower or other clean air system will be required during transit to the aircraft in a chemically hostile environment. It is recommended that the areas of the Balaclava exposed to the chemical environment be treated/covered with a permeable material to prevent penetration of the agent.

The close application of the lenses in front of the eyes of the aircrew member provides for a wide field of view and prescription lenses can be used in the balaclava on an insert/remove basis to reduce cost in the final configuration. This closely applied system also allows newer helmet mounted visors and displays to be integrated on the helmet "platform".

Although the idea of a Balaclava has been used previously for protection in extreme thermal environments, the concept of impregnating it with rubber strips and sealed goggles to ensure leak tight operation of various chemical protective masks has heretofore not been completed. The Balaclava is made from relatively inexpensive material and is disposable rather than requiring decontamination/handling. The invention is also compatible with all aircrew and ground crew masks, will require no aircraft modifications, and will provide neck protection from vapors during shelter processing procedures.

The application of this protective hood provides a margin of protection heretofore not attained. It can also be integrated with all newer helmet mounted devices being proposed for future aircraft and protective/information systems. The invention was developed to correct the deficiencies and failure modes of more costly and complex systems which are currently used. The system stands along as a unique design and provides a method for the donning/doffing of standard respirators while reducing risks of agent contamination. The aircrew design also provides an economical option for vapor protection in a chemical warfare environment.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A protective balaclava which may be worn under a flight helmet and under a chemical respirator to provide additional protection against toxic chemical agents, said balaclava fitting over a wearer's head and neck and having a flared apron to cover said wearer's shoulders, said balaclava having a facial opening with an edge which serves as a mask seal when used with chemical respirators, and wherein said balaclava is fabricated entirely from activated charcoal cloth to provide absorptive layers for additional protection against chemical vapors.

* * * * *